US011350048B1

(12) United States Patent
Magnani

(10) Patent No.: US 11,350,048 B1
(45) Date of Patent: May 31, 2022

(54) LUMINANCE-ADAPTIVE PROCESSING OF HEXA-DECA RGBW COLOR FILTER ARRAYS IN CMOS IMAGE SENSORS

(71) Applicant: SHENZHEN GOODIX TECHNOLOGY CO., LTD., Shenzhen (CN)

(72) Inventor: Alberto Mark Magnani, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/388,016

(22) Filed: Jul. 29, 2021

Related U.S. Application Data

(60) Provisional application No. 63/225,524, filed on Jul. 25, 2021.

(51) Int. Cl.
| | |
|---|---|
| *H04N 5/351* | (2011.01) |
| *H04N 9/04* | (2006.01) |
| *G06T 3/40* | (2006.01) |
| *H04N 5/343* | (2011.01) |
| *H04N 9/77* | (2006.01) |

(Continued)

(52) U.S. Cl.
CPC .......... *H04N 5/351* (2013.01); *G06T 3/4038* (2013.01); *H04N 5/343* (2013.01); *H04N 5/347* (2013.01); *H04N 5/378* (2013.01); *H04N 9/0451* (2018.08); *H04N 9/04559* (2018.08); *H04N 9/77* (2013.01)

(58) Field of Classification Search
CPC ........ H04N 5/351; H04N 5/343; H04N 5/347; H04N 5/378; H04N 9/0451; H04N 9/04559; H04N 9/77; G06T 3/4038
See application file for complete search history.

(56) References Cited

U.S. PATENT DOCUMENTS

| | | | | |
|---|---|---|---|---|
| 8,624,997 | B2 * | 1/2014 | Kuang ............... | H04N 9/04511 348/297 |
| 2015/0138407 | A1 * | 5/2015 | Kawaguchi ........ | H04N 9/04511 348/281 |

(Continued)

OTHER PUBLICATIONS

Non-final office action received in related U.S. Appl. No. 16/914,369 dated Feb. 8, 2022.

(Continued)

*Primary Examiner* — Nhan T Tran
(74) *Attorney, Agent, or Firm* — Kilpatrick Townsend & Stockton LLP

(57) ABSTRACT

Techniques are described for luminance-adaptive processing of hexa-deca red-green-blue-white (RGBW) color filter arrays (CFAs) in digital imaging systems. Original image data is acquired by a sensor array configured according to a hexa-deca RGBW CFA pattern, and associated ambient luminance information is also acquired. The ambient luminance information is used to detect one of a number of predetermined luminance conditions. Based on the detected luminance condition, embodiments can determine whether and how much to downsample the original image data as part of the readout from the sensor array (e.g., using binning techniques), and whether and how much to remosaic and/or upsample the downsampled data to generate an RGB output array for communication to other processing components of the imaging system.

20 Claims, 6 Drawing Sheets

(51) Int. Cl.
*H04N 5/378* (2011.01)
*H04N 5/347* (2011.01)

(56) References Cited

U.S. PATENT DOCUMENTS

| | | | |
|---|---|---|---|
| 2015/0281608 A1* | 10/2015 | Miyahara | H04N 9/04515 |
| | | | 348/308 |
| 2016/0248956 A1 | 8/2016 | Mitsunaga | |
| 2018/0357750 A1* | 12/2018 | Chen | G06T 3/4015 |
| 2019/0305018 A1 | 10/2019 | Price et al. | |
| 2020/0295096 A1* | 9/2020 | Min | H04N 5/347 |
| 2021/0021790 A1 | 1/2021 | Singh et al. | |
| 2021/0120214 A1* | 4/2021 | Byun | H04N 9/04557 |
| 2021/0217134 A1* | 7/2021 | Okamura | H04N 9/07 |
| 2021/0377497 A1* | 12/2021 | Bernstein | G06T 3/4007 |
| 2021/0390747 A1* | 12/2021 | Feng | G06T 11/60 |

OTHER PUBLICATIONS

Notice of allowance received in related U.S. Appl. No. 17/382,354 dated Apr. 11, 2022.

* cited by examiner

US 11,350,048 B1

LUMINANCE-ADAPTIVE PROCESSING OF HEXA-DECA RGBW COLOR FILTER ARRAYS IN CMOS IMAGE SENSORS

CROSS-REFERENCES

This application is a non-provisional of, and claims the benefit of priority from, U.S. Provisional Patent Application No. 63/225,524, titled "PIXEL BINNING FOLLOWED BY UPSAMPLING WITH RGBW CFA", filed Jul. 25, 2021, which is hereby incorporated by reference in its entirety.

TECHNICAL FIELD

This disclosure relates to digital imaging systems, and, more particularly, to luminance-adaptive processing of hexa-deca RGBW color filter arrays in CMOS image sensors, such as for smart phone cameras and/or other digital cameras.

BACKGROUND

Many electronic devices include digital imaging systems. For example, most modern smartphones include one or more digital cameras. Modern image sensors with high pixel counts (e.g., 48-Megapixel sensors, or the like) attempt to achieve high frame rate, low read noise, high dynamic range and/or other features with minimal power consumption (e.g., for longer battery life, less heating, etc.). The basic function of a modern CMOS image sensor (CIS) is to capture photons that are converted into electrons in a photodetector (e.g., a photodiode). These captured electrons are read out by a series of analog-to-digital converters (ADCs) included as part of the sensor.

Such CMOS image sensors tend to have difficulty operating well in low-light conditions for several reasons. One reason is that detection of multiple colors by the CIS tends to involve covering the photodetectors with a color filter array (CFA), which is an array of color filters arranged in a particular pattern. While the CFA allows the CIS to differentiate a scene in color, the color filters, by their very nature, reduce the number of photons collected by the photodetectors. Another reason CMOS image sensors tend to have difficulty operating well in low-light conditions is that many modern applications seek ever-increasing numbers of pixels in small sensor footprints, continually driving down pixel sizes. With smaller pixels, however, fewer photons per pixel tend to reach the active photodiode area to generate electron-hole pairs. In low-light conditions, there can already be a relatively small number of photons to collect. As such, further reductions of photon collection due to filtering by the CFA, shrinking pixel sizes, and/or other factors can result in a very low signal level. In some cases, the signal level is too low to support reliable reconstruction of imaging information, such as too low to reliably distinguish from noise.

Various conventional approaches are used to improve low-light performance. One example of a conventional approach is to increase power in the readout chain, which can tend to provide lower read noise and/or higher dynamic range, thereby improving image quality. However, higher power consumption also reduces battery lifetimes, increases thermal heating, and may have other undesirable consequences for sensor performance specifically, and/or consumer product implementations more generally. Another example of a conventional approach is to use pixel binning to combine outputs of multiple photodetectors in each color plane to effectively increase the signal level for each color plane. While such pixel binning can increase readout speed and reduce noise without an increase in power consumption, there is an appreciable trade-off in reduced sensor resolution. Thus, conventional CIS designs continue to struggle to achieve high performance in low-light conditions, while maintaining other features, such as high resolution, fast readout, low noise, and low power consumption.

SUMMARY

Embodiments provide systems and methods for luminance-adaptive processing of hexa-deca red-green-blue-white (RGBW) color filter arrays (CFAs) in digital imaging systems. Original image data is acquired by a sensor array configured according to a hexa-deca RGBW CFA pattern, and associated ambient luminance information is also acquired. The ambient luminance information is used to detect one of a number of predetermined luminance conditions. Based on the detected luminance condition, embodiments can determine whether and how much to downsample the original image data as part of the readout from the sensor array (e.g., using binning techniques), and whether and how much to remosaic and/or upsample the downsampled data to generate an RGB output array for communication to other processing components of the imaging system.

According to one set of embodiments, a method is provided for luminance-adaptive processing of hexa-deca RGBW CFAs CIS systems. The method includes: acquiring original image data by a photodetector array configured according to a hexa-deca RGBW CFA having an original array resolution; detecting a luminance condition for acquisition of the original image data by the photodetector array, the luminance condition being detected as one of a predetermined set of luminance conditions, comprising at least a high-luminance condition and a low-luminance condition; and generating sensor output signals to represent a Bayer-RGB output array based on the original image data and the luminance condition by: responsive to detecting the luminance condition as the high-luminance condition, remosaicking the original image data to convert from the hexa-deca RGBW CFA to the Bayer-RGB output array at an output array resolution; and responsive to detecting the luminance condition as the low-luminance condition, downsampling the original image data into a downsampled Bayer array and a downsampled luminance array, and upsampling the downsampled Bayer array based on the downsampled luminance array to generate the Bayer-RGB output array at the output array resolution.

According to another set of embodiments, an image sensor system is provided. The system includes: one or more processors to couple with a photodetector array configured, according to a hexa-deca RGBW CFA, to acquire original image data at an original array resolution; and a non-transient memory having instructions stored thereon, which, when executed, cause the one or more processors to perform steps. The steps include: detecting a luminance condition associated with acquisition of the original image data by the photodetector array, the luminance condition being detected as one of a predetermined set of luminance conditions, comprising at least a high-luminance condition and a low-luminance condition; and generating sensor output signals to represent a Bayer-RGB output array based on the original image data and the luminance condition by: responsive to detecting the luminance condition as the high-luminance condition, remosaicking the original image data to convert from the hexa-deca RGBW CFA to the Bayer-RGB output array at an output array resolution; and responsive to detecting the luminance condition as the low-luminance condition, directing downsampling of the original image data into a downsampled Bayer array and a downsampled luminance array, and upsampling the downsampled Bayer array based on the downsampled luminance array to generate the Bayer-RGB output array at the output array resolution.

BRIEF DESCRIPTION OF THE DRAWINGS

The accompanying drawings, referred to herein and constituting a part hereof, illustrate embodiments of the disclosure. The drawings together with the description serve to explain the principles of the invention.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Figure 1:
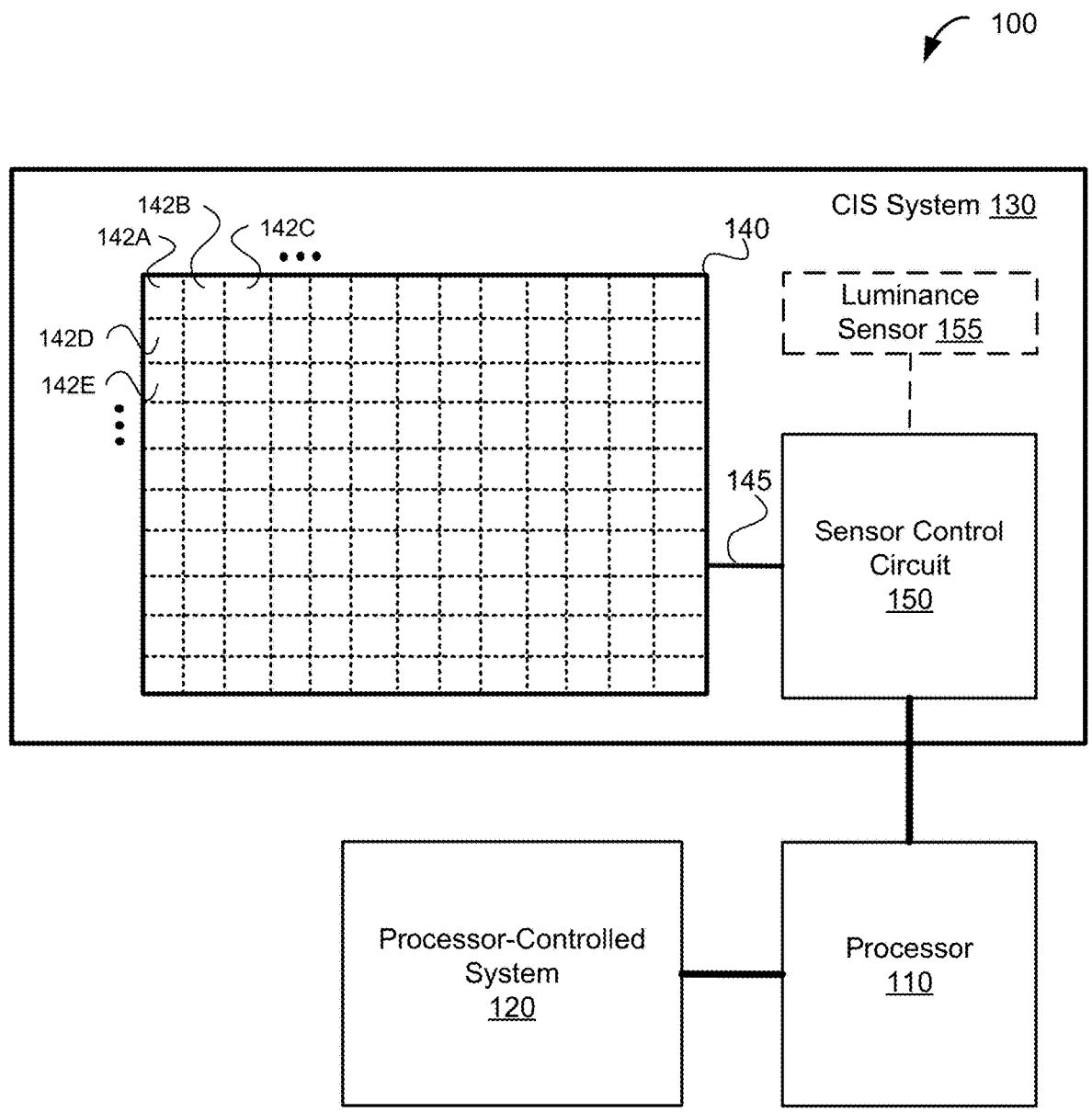
FIG. 1 shows a block diagram of an imaging sensor environment as context for various embodiments described herein.

Turning to FIG. 1, a block diagram is shown of an imaging sensor environment 100 as context for various embodiments described herein. The imaging sensor environment 100 is illustrated as including a processor 110 in communication with a processor-controlled system 120 and a complementary metal-oxide semiconductor (CMOS) imaging sensor (CIS) system 130. The imaging sensor environment 100 may be used to implement a digital imaging system in any suitable application context. For example, the processor 110, processor-controlled system 120, and CIS system 130 can all be implemented in a smartphone, digital camera, wearable device, implantable device, laptop computer, tablet computer, electronic reader, Internet of things (IoT) appliance, or any other suitable context.

The processor-controlled system 120 is intended generally to represent any suitable system or systems to provide any suitable features of the imaging sensor environment 100, other than those of the CIS system 130. For example, in a smart phone, the processor-controlled system 120 can include subsystems for providing telephonic and communications features, display features, user interaction features, application processing features, etc. Embodiments of the imaging sensor environment 100 can include one or more processors 110. In some embodiments, the one or more processors 110 are shared between the processor-controlled system 120 and the CIS system 130. In other embodiments, one or more processors 110 are used by the processor-controlled system 120, and the CIS system 130 has its own one or more dedicated processors 110.

Embodiments of the CIS system 130 include a sensor array 140 and a sensor control circuit 150. As described below, the sensor array 140 and sensor control circuit 150 can communicate via an interface channel 145. The sensor array 140 can be implemented as an array of photodetector elements 142, which can be implemented by any suitable photosensitive component or group of components. In some cases, the sensor array 140 is a high-pixel-count array, such as a 48 Megapixel array. In some implementations, each photodetector element 142 can include a photodiode and a filter that is configured to detect light energy in one or more frequency bands. The photodetector elements 142 can implement a color filter array (CFA), such that the sensor array 140 can detect light energy in at least the range of colors of the visible spectrum and can output corresponding electrical signals. It is assumed herein that the particular arrangement of the CFA is designed as a so-called hexa-deca red-green-blue-white (RGBW) CFA. As described below, such a CFA includes red, green, and blue (RGB) pixels with white (W) pixels (also referred to as "luminance pixels") evenly interspersed with approximately fifty-percent density.

Figure 2:
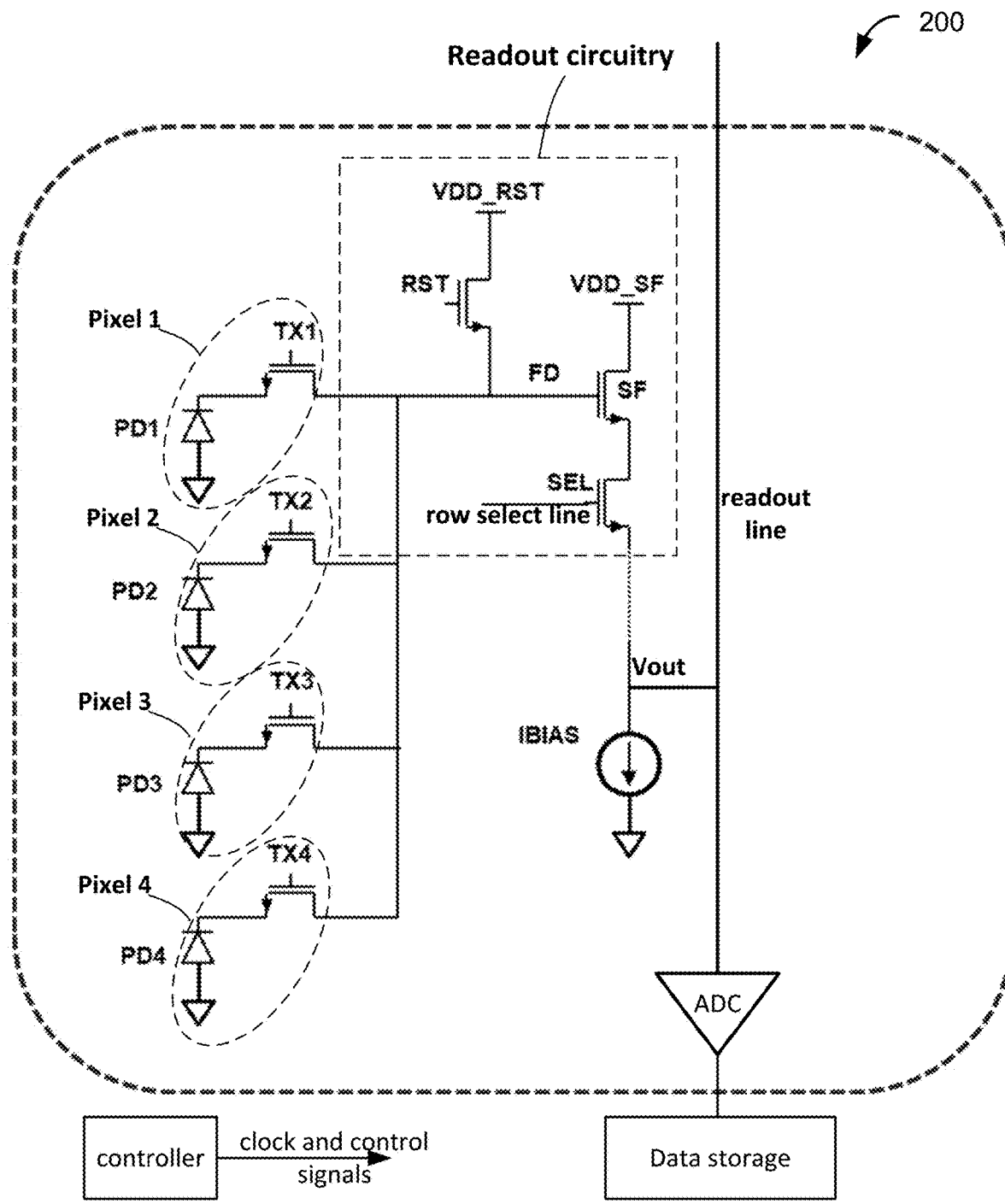
FIG. 2 shows a simplified schematic diagram of a portion of an example image sensor including pixels and readout circuitry that support one or more binning schemes for use with embodiments described herein.

Though not explicitly shown, the sensor array 140 also includes readout circuitry. As described below, the readout circuitry can generally include readout lines to selectively feed analog output signals from the photodetector elements 142 to analog-to-digital converters (ADCs), which can convert the analog output signals to digital output signals for output over the interface channel 145 to the sensor control circuit 150. For the sake of illustration, FIG. 2 shows a simplified schematic diagram 200 of a portion of an example image sensor including pixels and readout circuitry that support one or more binning schemes for use with embodiments described herein. The partial image sensor can be a partial implementation of the sensor array 140 of FIG. 1. The illustrated portion of the array is shown with four pixels, but the features exemplified by the schematic diagram 200 can be extended to any suitable number of pixels.

Each pixel is illustrated to include a photodiode (PD), or a photosensitive element, and a transfer transistor (TX) coupled to PD. The TXs of the pixels are all coupled to a floating diffusion node (FD) of readout circuitry. The readout circuitry includes a reset transistor (RST) having a drain node coupled with a reset voltage reference (VDD_RST), a source node coupled with FD (i.e., with the TXs), and a gate node controlled by a reset signal (RST). RST is configured to charge FD to VDD_RST when RST is turned ON, thereby resetting FD. Each PD may be reset along with FD by turning on its corresponding TX (e.g., by asserting or de-asserting a TXn control signal). The readout circuitry also includes a source follower transistor (SF) having a drain node coupled with a source follower voltage reference (VDD SF), a gate node coupled with FD (i.e., with the TXs), and a source node coupled with a drain node of a row select transistor (SEL). SEL has a gate node coupled to a row select line and a source node coupled with a voltage readout line that provides an analog output pixel signal (Vout) to an ADC for data conversion. The source node of SEL is also coupled to a current source (IBIAS). In the illustrated implementation, TX, RST, SF, and SEL are NMOS transistors. Alternative implementations can be designed using PMOS transistors, and/or other suitable components.

As shown, embodiments can include a controller to generate clock and control signals. The controller can be implemented using any suitable hardware, firmware, etc. In some implementations, the controller is integrated with the sensor array as an on-sensor component (e.g., as part of sensor array 140). In other implementations, the controller is implemented by a separate controller or processor as an off-sensor component (e.g., by the sensor control circuit 150). In other implementations, features of the controller are distributed between one or more on-sensor components and one or more off-sensor components. For example, the sensor control circuit 150 (off-sensor) can generate commands that direct timing and/or generation of particular control signals by an on-sensor controller. In some embodiments, the controller can include processing circuitry, logic state machines, phase locked loops, and/or the like to provide clock and control signals to the image sensor.

Further, embodiments can include data storage configured to store digital data representative of the pixel signals after pixel conversion by the ADC. In some implementations, the data storage includes buffers and/or registers for temporarily storing readout data prior to transmission of the data to other processing components (e.g., prior to transmission to the sensor control circuit 150 over the interface channel 145). For example, readout data is buffered in the data storage for fast, serialized transmission to the sensor control circuit 150.

Embodiments described herein dynamically exploit one or more binning schemes responsive to detected ambient luminance conditions. For example, no binning may be used in a first ambient luminance condition (e.g., a high-luminance condition), and a binning scheme may be used in a second ambient luminance condition (e.g., a low-luminance condition). Alternatively, a first binning scheme may be used in the first ambient luminance condition (e.g., the high-luminance condition), and a second binning scheme may be used in the second ambient luminance condition (e.g., a low-luminance condition). As used herein, "binning" refers to so-called charge binning, in which the charges of multiple pixels (e.g., corresponding to the amount of light, number of photons, etc. detected by the pixels) are added, averaged, or otherwise combined onto the readout line at one or multiple levels.

As illustrated, each pixel (e.g., a pixel on each row or each column) has its own TX. TXn control signals can be generated by the controller with particular timing to support different binning schemes. For the sake of illustration, the schematic diagram 200 can be used to implement readout without binning by using a single TX (e.g., TX1) to turn ON a single PD (e.g., PD1), thereby individually transferring charge from the single PD to FD (e.g., RST is turned on prior to turning on the TX to reset FD to VDD_RST). The charge on FD is then transferred via SF and SEL to the readout line and to the ADC for data conversion into digital data, which can then be stored in the data storage. Similarly, the schematic diagram 200 can be used to implement readout with binning by controlling multiple TXs (e.g., TX1-TX4) concurrently to turn ON all their respective PDs (e.g., PD1-PD4), thereby collectively transferring charge from multiple PDs to FD (e.g., RST is turned on prior to turning on the TXs to reset FD to VDD_RST). The combined charge now on FD is then transferred via SF and SEL to the readout line and to the ADC for data conversion into digital data, which can then be stored in the data storage. Different binning schemes can be supported, based on which pixels share a common FD, how many pixels share a common FD, capabilities of the controller, etc. In some embodiments, one or more binning schemes can involve multiple levels of binning. For example, a first binning scheme performs charge binning on 32 RGB pixels to generate 16 binned RGB pixel outputs, and a second binning scheme can re-bin the 16 binned RGB pixel outputs to generate four re-binned RGB pixel outputs. While the above descriptions refer to charge binning, embodiments can be implemented with other suitable type of binning, such as digital binning, binning in a later post-processing stage, etc.

Returning to FIG. 1, the sensor control circuit 150 can include any suitable processors and/or circuits for directing operation of the sensor array 140, processing signals received from the sensor array 140, and interfacing with other systems (e.g., processor 110). Some implementations of the sensor control circuit 150 are implemented as, or include a companion integrated circuit (IC) having integrated interface components, storage components, and processing components. For example, the processing components of the sensor control circuit 150 can include one or more central processing units (CPUs), application-specific integrated circuits (ASICs), application-specific instruction-set processors (ASIPs), graphics processing units (GPUs), physics processing units (PPUs), digital signal processors (DSPs), field-programmable gate array (FPGAs), programmable logic devices (PLDs), controllers, microcontroller units, reduced instruction set computer (RISC) processors, complex instruction set computer (CISC) processors, microprocessors, or the like, or any combination thereof.

As described herein, the CIS system 130 is configured to provide novel luminance-adaptive processing of hexa-deca RGBW CFAs in such an imaging sensor environment 100. For example, the sensor array acquires original image data from image capture of a scene. The CIS system 130 (e.g., the sensor array 140, a separate luminance sensor 155, or any other suitable component) also captures ambient luminance data affecting the original image data acquisition by the sensor array. A luminance condition is determined, such as detecting a higher-luminance condition or a lower-luminance condition. At higher luminance conditions, embodiments generally assume that sufficient quantities of photons are reaching active photodiode areas of individual pixels in the sensor array 140 to support a relatively direct generation (e.g., with less, or no downsampling and upsampling) of a higher-luminance image at full-sensor-array resolution. At lower luminance conditions, embodiments generally assume that sufficient quantities of photons are not reaching active photodiode areas of individual pixels in the sensor array 140, and one or more binning schemes can be used to improve the lower-luminance response. The binning schemes can be paired with upsampling techniques that leverage luminance data from the W-pixel color plane to effectively generate a lower-luminance image at the same full-sensor-array resolution. Some embodiments can support higher numbers of luminance conditions, such as a medium-luminance condition.

As noted above, embodiments are described with reference to a hexa-deca RGBW CFA. Many conventional CFAs are designed according to a Bayer-type pattern. Over the years, different variations of Bayer and non-Bayer CFA patterns have been explored by image sensor array designers, including using various degrees of luminance, and each design has had its own features and limitations. For example, some early Bayer patterns used a RGGB CFA, describing the green (G) pixels as providing added luminance (relative to the R and B pixels). Other previous and current CFA designs have used yellow (Y) pixels, such as in a RYYB pattern, or the like, to provide increased luminance relative to the G pixels. However, while some prior designs have sought to further increase luminance by adding white (W) (e.g., in a RWWB color pattern, or the like), those attempts have tended to be unsuccessful. For example, because of the large difference in amount of light received by the white and color pixels in any particular light condition, such prior designs have generally been unable to produce desirable response characteristics (e.g., signal-to-noise ratio, pixel conversion gain, etc.) across the array.

Figure 3:
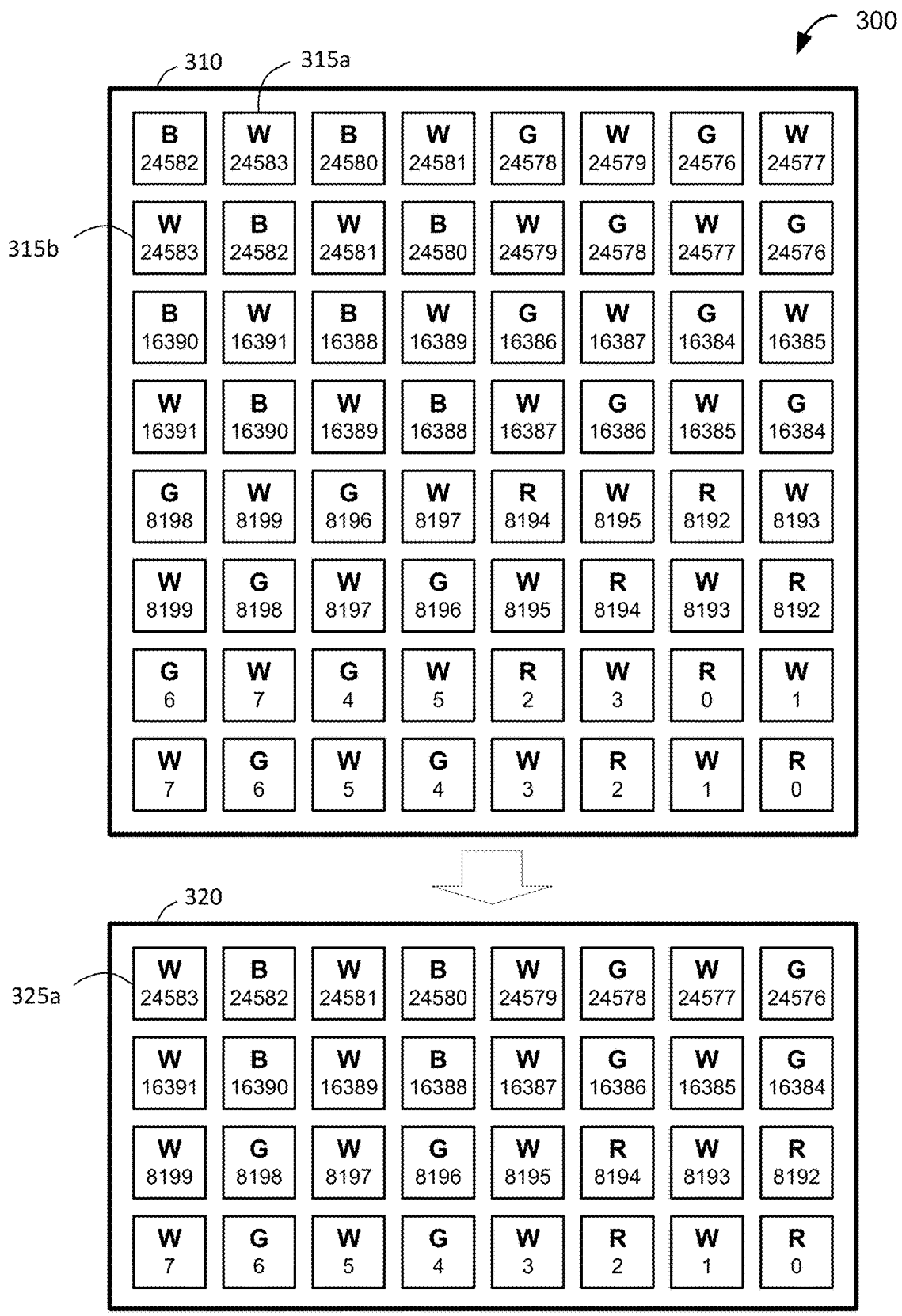
FIG. 3 shows an example of a hexa-deca red-green-blue-white (RGBW) color filter array (CFA) in context of a particular binning scheme, according to various embodiments described herein.

The hexa-deca RGBW CFA is a recently developed non-Bayer pattern in which W pixels are evenly interspersed among blocks of the RGB pixels in a manner that supports various dedicated techniques for produce desirable response characteristics. FIG. 3 shows an example of a hexa-deca RGBW CFA 310 in context of a particular binning scheme 300, according to various embodiments described herein. The illustrated hexa-deca RGBW CFA 310 includes an 8-by-8 array (e.g., which may be implemented as a quadrant of a larger 16-by-16 array, or the like) of photodiodes with approximately fifty percent W pixels, and approximately fifty percent RGB pixels. It can be seen that each location in the array alternates between an RGB pixel and a W pixel, such that the W pixels are evenly interspersed among the RGB pixels. It can be assumed that the illustrated hexa-deca RGBW CFA 310 is one block of a much larger array, such as the sensor array 140 of FIG. 1. For example, the entire CIS may include millions of total pixels implemented as thousands of instances of the hexa-deca RGBW CFA 310.

As described above, pixel binning generally involves arranging readout circuitry to effectively group pixels on a same color plane, so that the responses of those pixels (i.e., corresponding to the amount of light detected) can be summed, averaged, or otherwise combined. Different types of CFAs can be binned in different ways, and novel binning techniques are invented for novel types of CFAs. For example, in a conventional Bayer pattern CFA, pixels of the same color can be combined before ADC readout; in a conventional quad-Bayer pattern, 2-by-2 pixel clusters can be combined prior to ADC readout; etc.

Such conventional Bayer-type binning approaches cannot be directly applied to hexa-deca RGBW CFAs because the W pixels are interspersed with the RGB pixels throughout the array in a particular manner. Various approaches to pixel binning in context of hexa-deca RGBW CFAs 310 are described and illustrated in U.S. patent application Ser. No. 17/382,354, titled "PIXEL BINNING FOR HEXA-DECA RGBW COLOR FILTER ARRAYS," which is hereby incorporated by reference in its entirety. In general, such binning schemes use diagonal pixel binning concepts that merge local R, G, B and W pixels, while seeking to optimize circuit noise performance.

In FIG. 3, the 8-by-8 hexa-deca RGBW CFA block 310 is binned to generate a 4-by-8 down-sampled block 320. Each labeled box in the hexa-deca RGBW CFA block 310 represents an un-binned pixel 315. Each labeled box in the down-sampled block 320 represents a binned pixel 325. Each label indicates a color as "R", "G", "B", or "W", representing red, green, blue, or white, respectively. Each label also indicates a binning index. For example, the pixel in the lower-right-most position in the illustrated array is illustrated as "R0", indicating that the pixel is red and is part of a 0th binning group; and the pixel in the upper-left-most position in the illustrated array is illustrated as "B24582", indicating that the pixel is blue and is part of a 24,582nd binning group. The particular binning index numbers shown in FIG. 3 can represent a case where the illustrated 8-by-8 hexa-deca RGBW CFA block 310 is the lower-right-most block of a much larger array including thousands of such blocks 310.

As illustrated, each un-binned pixel 315 in each row of the hexa-deca RGBW CFA block 310 has a different binning index from each other un-binned pixel 315 in the row. For example, the bottom row of the hexa-deca RGBW CFA block 310 includes eight un-binned pixels 315 having indexes '0' through '7'. However, each un-binned pixel 315 in each second row of the hexa-deca RGBW CFA block 310 shares a binning index with a diagonally adjacent one of the un-binned pixels 315 in the row immediately below. For example, un-binned pixel 315a in the top row (i.e., the eighth row) of the hexa-deca RGBW CFA block 310 is a white pixel in the 24,583rd binning group, and diagonally adjacent un-binned pixel 315b in the row immediately below (i.e., the seventh row) of the hexa-deca RGBW CFA block 310 is also a white pixel in the 24,583rd binning group. This is intended to represent that binning of the pixels in the hexa-deca RGBW CFA block 310 involves combining (e.g., summing, averaging, etc. the charges of) those un-binned pixel 315 having same indexes (e.g., by concurrently turning ON those pixels to pass a combined charge to readout circuitry, such as described with respect to FIG. 2). For example, un-binned pixel 315a is binned with diagonally adjacent un-binned pixel 315b to be read out as a single binned pixel 325a in the down-sampled block 320.

Using the illustrated approach, it can be seen that the binning will essentially result in the same number of columns, and half as many rows. Thus, the binning enables reading out of the entire array with half the number of readout operations. Such a binning approach can be referred to as a "1Hx2V" binning approach, indicating that the horizontal dimension is divided by '1' (i.e., the array is not down-sampled in the horizontal dimension), and the vertical dimension is divided by '2' (i.e., the array is down-sampled by a factor of two in the vertical dimension). The same binning result can also be considered as two 4-by-4 arrays: a downsampled (4-by-4) RGB output array made up of alternating columns of binned RGB pixel data, and a down-sampled (4-by-4) luminance output array made up of alternating columns of binned white pixel data. Using the illustrated approach, the downsampled RGB output array is a Bayer-type array, particularly a quad-Bayer array.

Figure 4:
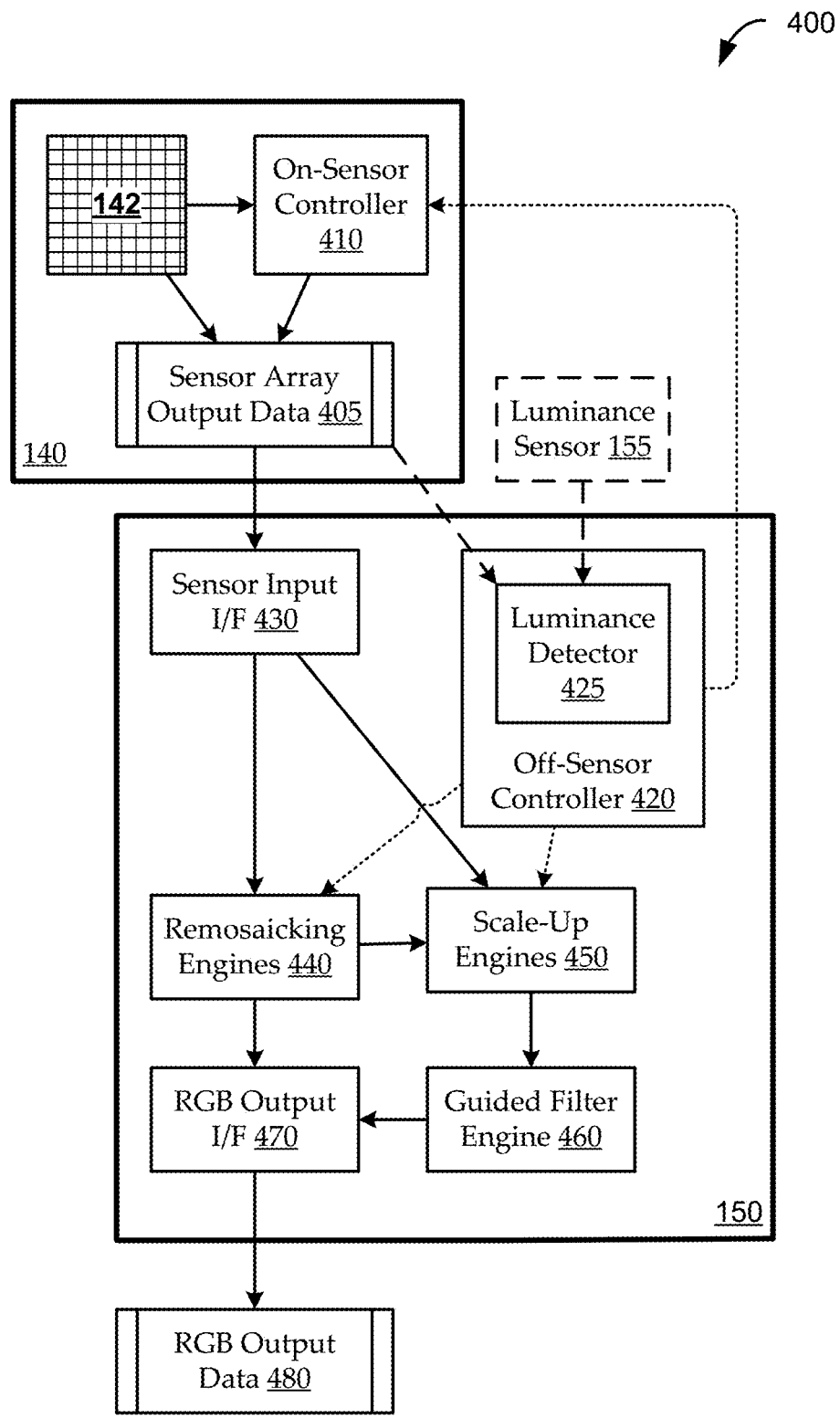
FIG. 4 shows an illustrative system for luminance-adaptive processing of hexa-deca RGBW CFAs, according to various embodiments.

FIG. 4 shows an illustrative system 400 for luminance-adaptive processing of hexa-deca RGBW CFAs, according to various embodiments. Embodiments of the system 400 include a sensor array 140 coupled with a CIS system 130. The sensor array 140 can include an array of photodetectors 142 implemented as a hexa-deca RGBW CFA configured to acquire original image data at an original array resolution. The original array resolution corresponds to the number of pixels in the array (e.g., a 48 Megapixel array can be said to have 48 Megapixels of original array resolution). Notably, this may not be the same as the output resolution of the imaging sensor. For example, after processing of the image to combine color planes, etc., a 48-Megapixel hexa-deca RGBW CFA may only support a final imaging resolution of 12 Megapixels, or some other resolution smaller than the original array resolution.

Embodiments can include one or more processors. In some embodiments, the one or more processors implement an on-sensor controller 410, which can be integrated with (e.g., including circuitry of) the sensor array 140. The one or more processors can also implement an off-sensor controller 420, which can be part of the CIS system 130. The one or more processors can implement various engines of the CIS system 130, such as one or more remosaicking engines 440, one or more scale-up engines 450, and one or more guided filter engines 460. Embodiments of the CIS system 130 can also include one or more interfaces, such as a sensor input interface 430 and an RGB output interface 470. The sensor input interface 430 can include any suitable components for receiving imaging data from, and transmitting commands and/or other information to the sensor array 140, such as via the interface channel 145. The imaging data received from the sensor array 140 can be sensor array output data 405. The RGB output interface 470 can include any suitable components for transmitting imaging data to, and transmitting and/or receiving commands and/or other information from other processing components (e.g., processor 110 of FIG. 1). The imaging data output from the CIS system 130 can be RGB output data 480.

Though not explicitly shown, the various controllers and engines implemented by the one or more processors operate based on instructions stored in one or more processor-readable, non-transient memories. For example, the on-sensor controller 410 and the off-sensor controller 420 can each have, and/or be coupled with, one or more memories having firmware, software, and/or other instructions stored thereon. Executing the stored instructions can configure the processors and/or other circuitry to perform luminance-adaptive processing of the original image data from the array of photodetectors 142 to generate the RGB output data 480.

Embodiments of the off-sensor controller 420 include a luminance detector 425 to detect an ambient luminance condition associated with acquisition of the original image data by the sensor array 140. The ambient luminance condition is detected as (e.g., or identified as) one of a predetermined set of luminance conditions, which can include at least a high-luminance condition and a low-luminance condition. In some implementations, the predetermined set of luminance conditions also includes a mid-luminance (or medium-luminance) condition, and/or one or more additional luminance conditions. In some embodiments, the luminance detector 425 is coupled with a luminance sensor 155, which may be integrated with the sensor array 140, integrated with the CIS system 130, implemented separately from both the sensor array 140 and the CIS system 130, or implemented in any other suitable manner. The luminance sensor 155 can include any components suitable for obtaining one or more ambient luminance measurements affecting some or all regions of the array of photodetectors 142, such as one or more light level meters, photodiodes, etc. In other embodiments, the luminance detector 425 derives luminance information from the sensor array output data 405, such as from white pixel data.

In some embodiments, the luminance detector 425 outputs a single determination of a luminance condition for the entire array of photodetectors 142 for association with at least present image acquisition frame. In other embodiments, the luminance detector 425 outputs respective determinations of luminance conditions for each of multiple regions of the array of photodetectors 142, such as by segmenting the array of photodetectors 142 into quadrants or regions, making block-level determinations for 16-by-16-pixel hexa-deca RGBW CFA blocks (e.g., or any other suitably sized blocks), etc. In some embodiments, each determination of luminance condition made by the luminance detector 425 is effective for only a present image acquisition frame. In other embodiments, some or all determinations of luminance condition made by the luminance detector 425 are associated with an effectiveness window, such that the same determination can be used across multiple image acquisition frames. The effectiveness window can be based on a certain amount of time, a certain number of image acquisition frames, a detected threshold change in overall lighting conditions (e.g., made by the luminance detector 425, by the luminance sensor 155, etc.), etc. In some embodiments, the luminance detector 425 makes its determination(s) of luminance condition based on luminance information acquired concurrent with the present image acquisition frame. For example, present ambient luminance information is obtained from the luminance sensor 155 along with obtaining sensor array output data 405 from the sensor array 140. In other embodiments, the luminance detector 425 makes its determination(s) of luminance condition based on luminance information acquired prior to the present image acquisition frame. For example, pixel data obtained by white (luminance) pixels of the hexa-deca RGBW CFAs in one or more prior image acquisition frames is used by the luminance detector 425 to derive luminance data and make determination(s) of luminance condition for one or more subsequent image acquisition frames.

The luminance condition determined by the luminance detector 425 is used by the off-sensor controller 420 to generate various control signals, thereby directing luminance-adaptive processing of the original image data from the array of photodetectors 142. Embodiments of the off-sensor controller 420 implements such luminance-adaptive processing by adaptively directing whether and/or how much downsampling to apply to the original image data by the on-sensor controller 410, such as by using one or more binning schemes; by adaptively directing whether and/or how much upsampling to apply to downsampled image data by the scale-up engines 450; and by adaptively directing whether and/or how much remosaicking to perform on original and/or downsampled image data by the remosaicking engines 440.

Figure 5:
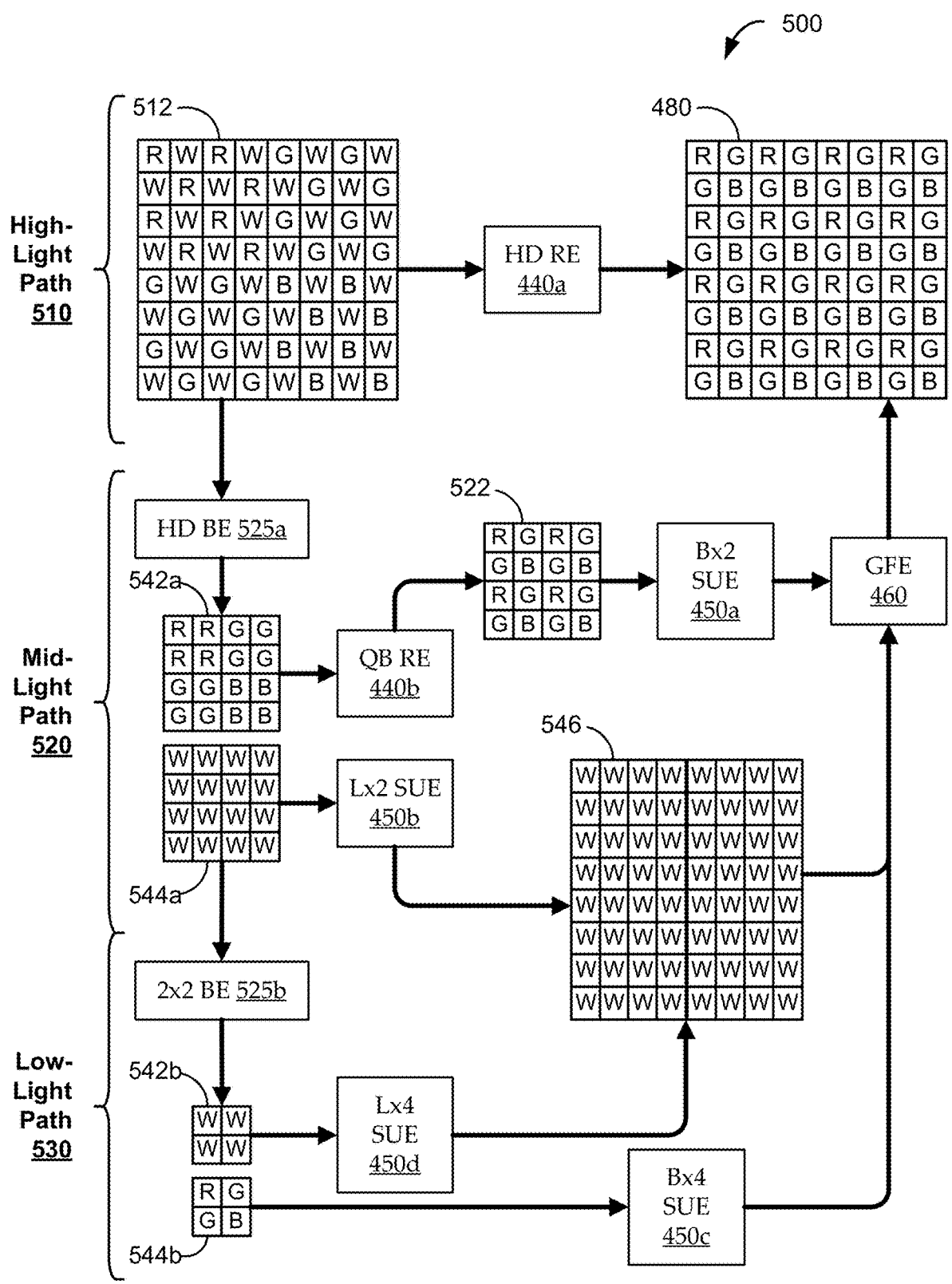
FIG. 5 shows a data flow diagram for luminance-adaptive processing of hexa-deca RGBW CFAs using the system of FIG. 4, according to various embodiments.

For added clarity, FIG. 5 shows a data flow diagram 500 for luminance-adaptive processing of hexa-deca RGBW CFAs using the system 400 of FIG. 4, according to various embodiments. The illustrated embodiments of FIG. 5 assume three detectable ambient luminance conditions and associated processing paths: a high-luminance condition processed according to a high-light path 510, a medium-luminance condition processed according to a mid-light path 520, and a low-luminance condition processed according to a low-light path 530. The input to each processing path is same original image data 512 acquired by the sensor array 140 at an original array resolution, and the output to each processing path is the RGB output data 480.

In some instances, the luminance detector 425 detects the luminance condition as a high-luminance condition. Responsive to such detection, embodiments of the off-sensor controller 420 can direct the sensor array 140 to output the sensor array output data 405 at the original array resolution: as the original image data 512 (e.g., un-binned). The un-binned original image data 512 can be received by the CIS system 130 via the sensor input interface 430 and passed to a first of the remosaicking engines 440a, where the hexa-deca RGBW CFA-arranged pixel data can be remosaicked to a standard Bayer-RGB output array format for communication to other processing components (as the RGB output data 480). As used herein, "Bayer-RGB" is used generally to refer to a standard RGGB Bayer CFA pattern as expected by a standard output interface, and "Quad-Bayer" is used to refer specifically to a type of Bayer CFA pattern that has 2-by-2 blocks of same-color pixels arranged into a 4-by-4 RGGB pattern.

As used herein, "remosaicking" generally refers to converting an input array in an input CFA format to an output array in an output array format by using pixel values from the input array to estimate corresponding values in the output array. Suppose first and second adjacent pixels of an input array are 'R' and 'W' pixels of a hexa-deca RGBW CFA pattern, respectively; and a corresponding two adjacent pixels of an output array are 'R' and 'G' pixels of a Bayer-RGB CFA pattern, respectively. Remosaicking for such a case may use the 'R' in the first position of the input array directly as the 'R' in the first position of the output array. However, the to 'G' pixel in the second position of the output array is not directly obtained from the corresponding 'W' pixel of the input array; rather, the remosaicking can estimate the 'G' pixel from surrounding information, such as from nearby 'G' pixels, other color pixels, luminance information, and/or other information (e.g., using interpolation, filtering, and/or other techniques). Any suitable remosaicking approach can be used.

As noted above, the high-light path 510 can effectively process the pixel information with an assumption that sufficient light is being received by the pixels to achieve a good signal to noise ratio. For lower-luminance conditions, the respective processing paths assume this is not the case, and use different binning schemes, accordingly. In response to detecting any of the lower-luminance conditions, embodiments of the off-sensor controller 420 can direct the sensor array 140 to downsample the original image data 512 into a downsampled Bayer array 542 and a downsampled luminance array 544, and to upsample the downsampled Bayer array 542 based on the downsampled luminance array 544 to generate the RGB output data 480 at an output array resolution (e.g., at the original array resolution).

In some instances, the luminance detector 425 detects the lower-luminance condition as a medium-luminance condition. In response to such detecting, embodiments of the off-sensor controller 420 can direct the sensor array 140 (e.g., the on-sensor controller 410) to readout the sensor array output data 405 according to a first binning scheme. In effect, the on-sensor controller 410 can reconfigure readout circuitry as a first binning engine 525a (labeled as a hexa-deca binning engine, "HD BE"). In the illustrated embodiment, the first binning engine 525a configures the readout circuitry for the 1Hx2V binning scheme illustrated in FIG. 3, resulting in a first downsampled Bayer array 542a (a Quad-Bayer array generated by binning of the binned RGB pixels) and a first downsampled luminance array 544a (generated by binning of the W pixels). Each of the first downsampled Bayer array 542a and the first downsampled luminance array 544a are downsampled by a factor of two by diagonal binning of pairs of pixels in like color planes.

The off-sensor controller 420 can direct a second remosaicking engine 440b (labeled as a Quad-Bayer remosaicking engine, "QB RE") to convert the first downsampled Bayer array 542a from the Quad-bayer CFA pattern to a standard Bayer-RGB pattern array 522. The off-sensor controller 420 can then direct a first scale-up engine 450a (labeled as a Bayer x2 Scale-Up Engine, or "Bx2 SUE") to scale-up the remosaicked Bayer-RGB pattern array 522 by a factor of two. Such scaling up can effectively generate a template array for subsequent upsampling. In one implementation, the scaling up generates an array of twice the horizontal dimension and twice the vertical dimension by inserting a placeholder value between each pixel value of the remosaicked Bayer-RGB pattern array 522. For example, if a row of the remosaicked Bayer-RGB pattern array 522 is RGRG, the corresponding top row of the scaled-up array may be RPGPRPGP, where 'P' represents a placeholder value. In another implementation, the scaling up generates an array of twice the horizontal dimension and twice the vertical dimension by inserting a cell between each cell of the remosaicked Bayer-RGB pattern array 522 and copying each pixel value of the remosaicked Bayer-RGB pattern array 522 to its adjacent inserted cell in the scaled-up array. For example, if a row of the remosaicked Bayer-RGB pattern array 522 is RGRG, the corresponding top row of the scaled-up array may be RRGGRRGG. Any other suitable techniques can be used for scaling up the array. The off-sensor controller 420 can direct a second scale-up engine 450b (labeled as a Luminance x2 Scale-Up Engine, or "Lx2 SUE") to scale-up the first downsampled luminance array 544a by a factor of two to generate a scaled-up luminance array 546. The scaling up of the first downsampled luminance array 544a can be performed using techniques that are the same as, or different from those used to scale up the first downsampled Bayer array 542a. Importantly, the scaled-up Bayer array and the scaled-up luminance array 546 have the same dimensions.

Embodiments of the off-sensor controller 420 can direct the guided filter engine 460 to effectively upsample the scaled-up Bayer array into the RGB output data 480 based on the scaled-up luminance array 546. In some embodiments, the guided filter engine 460 can perform such upsampling according to techniques that are the same as, or similar to those used by the remosaicking engines 440. Implementations of the guided filter engine 460 can generate pixel values for some or all pixel values of the RGB output data 480 by, for each target pixel, identifying values of same-color pixels and luminance pixels that are local to the target pixel location (based on the respective scaled-up arrays), using the values and distances of those identified pixels from the target pixel to generate weighting factors, and applying one or more filtering algorithms to interpolate the target pixel values. For example, luminance values from the W pixels of the scaled-up luminance array 546, and distances of those pixels from a particular target pixel can be used to compute weights, and those weights, along with values of neighboring same-color pixels can be input to a joint bilateral filter to compute the target (upsampled) pixel values for the RGB output data 480.

In some instances, the luminance detector 425 detects the lower-luminance condition as a low-luminance condition (i.e., lower luminance than the medium-luminance condition). In response to such detecting, embodiments of the off-sensor controller 420 can direct the sensor array 140 (e.g., the on-sensor controller 410) to readout the sensor array output data 405 according to a second binning scheme. In effect, the on-sensor controller 410 can reconfigure readout circuitry as a series of first and second binning engines 525 (including the first binning engine 525a described above and a second binning engine 525b, labeled as a 2x2 binning engine, "2x2 BE"). In the illustrated embodiment, the first binning engine 525a, as described above, to configure the readout circuitry for the 1Hx2V binning scheme illustrated in FIG. 3, resulting in the first downsampled Bayer array 542a and the first downsampled luminance array 544a. The second binning engine 525b configures the readout circuitry for a 2Hx2V binning scheme, resulting in a second downsampled Bayer array 542b and a second downsampled luminance array 544b. Each of the first downsampled Bayer array 542a and the first downsampled luminance array 544a are downsampled by a factor of 2, relative to the first downsampled Bayer array 542a and the first downsampled luminance array 544a. For example, each 2-by-2 color block of the quad-Bayer CFA pattern of the first downsampled Bayer array 542a can be binned together into a single pixel of the second downsampled Bayer array 542b. The second downsampled Bayer array 542b and second downsampled luminance array 544b can each also be considered as downsampled by a factor of four relative to the original image data 512.

The off-sensor controller 420 can then direct a third scale-up engine 450c (labeled as a Bayer ×4 Scale-Up Engine, or "Bx4 SUE") to scale-up the second downsampled Bayer array 542b by a factor of four, and a fourth scale-up engine 450d (labeled as a Luminance ×4 Scale-Up Engine, or "Lx4 SUE") to scale-up the second downsampled luminance array 544b also by the same factor of four. As in the mid-light path 520 described above, the upscaling in the low-light path 530 results in a scaled-up Bayer array and the scaled-up luminance array 546, both having the same dimensions (also the same dimensions as the RGB output data 480). Embodiments of the low-light path 530 can proceed substantially as the mid-light path 520; embodiments of the off-sensor controller 420 can direct the guided filter engine 460 to upsample the scaled-up Bayer array into the RGB output data 480 based on the scaled-up luminance array 546, as described above.

Figure 6:
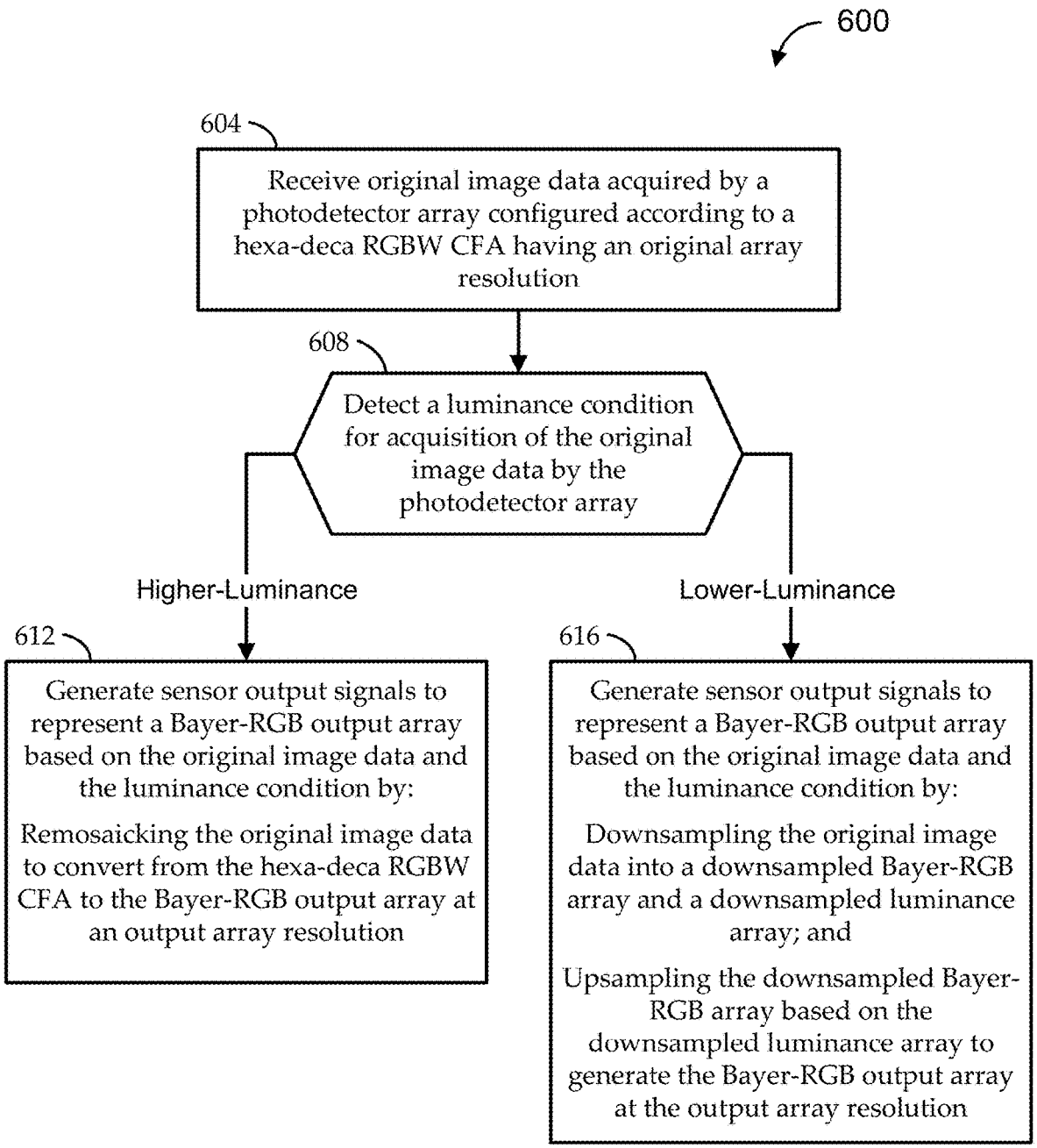
FIG. 6 shows a flow diagram of an illustrative method for luminance-adaptive processing of hexa-deca RGBW CFAs in CIS systems, according to various embodiments.

FIG. 6 shows a flow diagram of an illustrative method 600 for luminance-adaptive processing of hexa-deca RGBW CFAs in CIS systems, according to various embodiments. Embodiments of the method 600 can begin at stage 604 by acquiring original image data by a photodetector array configured according to the hexa-deca RGBW CFA having an original array resolution. At stage 608, embodiments can detect a luminance condition for acquisition of the original image data by the photodetector array. As described herein, the luminance condition can be detected as one of a predetermined set of luminance conditions, such as at least a high-luminance condition and a low-luminance condition. In some embodiments, the original image data is acquired at stage 604 in an image acquisition frame by the photodetector array, and the detecting the luminance condition at stage 608 is based on luminance data acquired prior to the image acquisition frame. For example, the detecting the luminance condition in stage 608 can include extracting luminance pixel data from preceding image data acquired by the photodetector array in a preceding image acquisition frame, and detecting the luminance condition based on the luminance pixel data. In some embodiments, the photodetector array includes multiple array regions (e.g., quadrants, etc.), and the detecting the luminance condition at stage 608 includes detecting respective region-level luminance conditions for each of at least a portion of the plurality of array regions. In some such embodiments, each of the array regions is one of multiple hexa-deca RGBW CFA blocks.

The detecting at stage 608 can be considered as a decision block, whereby the method 600 can proceed along different paths depending on the result of the detecting. In particular, the method 600 can proceed to generate sensor output signals to represent a Bayer-RGB output array based on the original image data and the luminance condition according to stage 612 or 616. The method 600 can perform stage 612 responsive to detecting the luminance condition at stage 608 as the high-luminance condition. In response thereto, embodiments can remosaic the original image data to convert from the hexa-deca RGBW CFA to the Bayer-RGB output array at an output array resolution. The method 600 can perform stage 616 responsive to detecting the luminance condition at stage 608 as the low-luminance condition. In response thereto, embodiments can downsample the original image data into a downsampled Bayer array and a downsampled luminance array, and can upsample the downsampled Bayer array based on the downsampled luminance array to generate the Bayer-RGB output array at the output array resolution.

In some embodiments, the output array resolution is equal to the original array resolution. In other embodiments, the output array resolution is the same for all detected luminance conditions, but is different from the original array resolution. In some embodiments, the low-luminance condition is detected at stage 608 is one of multiple low-luminance conditions, such as a first low-luminance condition (e.g., a medium-luminance condition) and a second low-luminance condition (e.g., a lowest luminance condition). In response to detecting the luminance condition as the first low-luminance condition, the downsampling is by a first downsampling factor, such that each of the downsampled Bayer array and the downsampled luminance array has a first downsampled resolution that is smaller than the original array resolution by the first downsampling factor. Responsive to detecting the luminance condition as the second low-luminance condition, the downsampling is by a second downsampling factor, such that each of the downsampled Bayer array and the downsampled luminance array has a second downsampled resolution that is smaller than the original array resolution by the second downsampling factor, the second downsampling factor being higher than the first downsampling factor.

In some embodiments, responsive to detecting the luminance condition as the first low-luminance condition, the downsampling includes diagonally binning the original image data to generate a quad-Bayer array at the first downsampled resolution and to generate the downsampled luminance array at the first downsampled resolution, and remosaicking the quad-Bayer array into the downsampled Bayer array. In such embodiments, the upsampling can include scaling up the downsampled Bayer array based on the first downsampling factor to generate an upscaled Bayer-RGB array, scaling up the downsampled luminance array based on the first downsampling factor to generate an upscaled luminance array, and upsampling the upscaled Bayer-RGB array based on the upscaled luminance array to generate the Bayer-RGB output array at the output array resolution.

In some embodiments, responsive to detecting the luminance condition as the second low-luminance condition, the downsampling includes diagonally binning the original image data to generate a quad-Bayer array at the first downsampled resolution and to generate a pre-downsampled luminance array at the first downsampled resolution, and re-binning the quad-Bayer array and the pre-downsampled luminance array to generate the downsampled Bayer array and the downsampled luminance array at the second downsampled resolution. The diagonally binning and the re-binning together downsample the original image data by the second downsampling factor. In such embodiments, the upsampling can include scaling up the downsampled Bayer array based on the second downsampling factor to generate an upscaled Bayer-RGB array, scaling up the downsampled luminance array based on the second downsampling factor to generate an upscaled luminance array, and upsampling the upscaled Bayer-RGB array based on the upscaled luminance array to generate the Bayer-RGB output array at the output array resolution.

In some embodiments, responsive to detecting the luminance condition as the second low-luminance condition, the downsampling includes diagonally binning the original image data to generate the downsampled Bayer array at the second downsampled resolution and to generate the downsampled luminance array at the second downsampled resolution. In such embodiments, the upsampling can include scaling up the downsampled Bayer array based on the second downsampling factor to generate an upscaled Bayer-RGB array, scaling up the downsampled luminance array based on the second downsampling factor to generate an upscaled luminance array, and upsampling the upscaled Bayer-RGB array based on the upscaled luminance array to generate the Bayer-RGB output array at the output array resolution.

While this disclosure contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A recitation of "a", "an" or "the" is intended to mean "one or more" unless specifically indicated to the contrary. Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

All patents, patent applications, publications, and descriptions mentioned here are incorporated by reference in their entirety for all purposes. None is admitted to be prior art.

What is claimed is:

1. A method for luminance-adaptive processing of hexa-deca red-green-blue-white (RGBW) color filter arrays (CFAs) in complimentary metal-oxide semiconductor (CMOS) image sensor (CIS) systems, the method comprising:
   acquiring original image data by a photodetector array configured according to a hexa-deca RGBW CFA having an original array resolution;
   detecting a luminance condition for acquisition of the original image data by the photodetector array, the luminance condition being detected as one of a predetermined set of luminance conditions, comprising at least a high-luminance condition and a low-luminance condition; and
   generating sensor output signals to represent a Bayer-RGB output array based on the original image data and the luminance condition by:
     responsive to detecting the luminance condition as the high-luminance condition, remosaicking the original image data to convert from the hexa-deca RGBW CFA to the Bayer-RGB output array at an output array resolution; and
     responsive to detecting the luminance condition as the low-luminance condition, downsampling the original image data into a downsampled Bayer array and a downsampled luminance array, and upsampling the downsampled Bayer array based on the downsampled luminance array to generate the Bayer-RGB output array at the output array resolution.

2. The method of claim 1, wherein the output array resolution is equal to the original array resolution.

3. The method of claim 1, wherein:
   the low-luminance condition is a first low-luminance condition;
   the predetermined set of luminance conditions further comprises a second low-luminance condition;
   responsive to detecting the luminance condition as the first low-luminance condition, the downsampling is by a first downsampling factor, such that each of the downsampled Bayer array and the downsampled luminance array has a first downsampled resolution that is smaller than the original array resolution by the first downsampling factor; and
   responsive to detecting the luminance condition as the second low-luminance condition, the downsampling is by a second downsampling factor, such that each of the downsampled Bayer array and the downsampled luminance array has a second downsampled resolution that is smaller than the original array resolution by the second downsampling factor, the second downsampling factor being higher than the first downsampling factor.

4. The method of claim 3, wherein:
   the downsampling, responsive to detecting the luminance condition as the first low-luminance condition, comprises:
     diagonally binning the original image data to generate a quad-Bayer array at the first downsampled resolution and to generate the downsampled luminance array at the first downsampled resolution; and
     remosaicking the quad-Bayer array into the downsampled Bayer array; and the upsampling, responsive to detecting the luminance condition as the first low-luminance condition, comprises:
scaling up the downsampled Bayer array based on the first downsampling factor to generate an upscaled Bayer-RGB array;
scaling up the downsampled luminance array based on the first downsampling factor to generate an upscaled luminance array; and
upsampling the upscaled Bayer-RGB array based on the upscaled luminance array to generate the Bayer-RGB output array at the output array resolution.

5. The method of claim 3, wherein:
the downsampling, responsive to detecting the luminance condition as the second low-luminance condition, comprises:
diagonally binning the original image data to generate a quad-Bayer array at the first downsampled resolution and to generate a pre-downsampled luminance array at the first downsampled resolution; and
re-binning the quad-Bayer array and the pre-downsampled luminance array to generate the downsampled Bayer array and the downsampled luminance array at the second downsampled resolution, wherein the diagonally binning and the re-binning together downsample the original image data by the second downsampling factor; and
the upsampling, responsive to detecting the luminance condition as the second low-luminance condition, comprises:
scaling up the downsampled Bayer array based on the second downsampling factor to generate an upscaled Bayer-RGB array;
scaling up the downsampled luminance array based on the second downsampling factor to generate an upscaled luminance array; and
upsampling the upscaled Bayer-RGB array based on the upscaled luminance array to generate the Bayer-RGB output array at the output array resolution.

6. The method of claim 3, wherein:
the downsampling, responsive to detecting the luminance condition as the second low-luminance condition, comprises diagonally binning the original image data to generate the downsampled Bayer array at the second downsampled resolution and to generate the downsampled luminance array at the second downsampled resolution; and
the upsampling, responsive to detecting the luminance condition as the second low-luminance condition, comprises:
scaling up the downsampled Bayer array based on the second downsampling factor to generate an upscaled Bayer-RGB array;
scaling up the downsampled luminance array based on the second downsampling factor to generate an upscaled luminance array; and
upsampling the upscaled Bayer-RGB array based on the upscaled luminance array to generate the Bayer-RGB output array at the output array resolution.

7. The method of claim 3, wherein:
the first downsampling factor reduces a horizontal resolution of the original image data by a factor of two, and reduces a vertical resolution of the original image data by a factor of two; and
the second downsampling factor reduces a horizontal resolution of the original image data by a factor of four, and reduces a vertical resolution of the original image data by a factor of four.

8. The method of claim 1, wherein:
the original image data is acquired in an image acquisition frame by the photodetector array; and
the detecting the luminance condition is based on luminance data acquired prior to the image acquisition frame.

9. The method of claim 8, wherein:
the detecting the luminance condition comprises extracting luminance pixel data from preceding image data acquired by the photodetector array in a preceding image acquisition frame, and detecting the luminance condition based on the luminance pixel data.

10. The method of claim 1, wherein:
the photodetector array comprises a plurality of array regions; and
the detecting the luminance condition comprises detecting respective region-level luminance conditions for each of at least a portion of the plurality of array regions.

11. The method of claim 10, wherein each of the array regions is one of a plurality of hexa-deca RGBW CFA blocks.

12. An image sensor system comprising:
one or more processors to couple with a photodetector array configured, according to a hexa-deca red-green-blue-white (RGBW) color filter array (CFA), to acquire original image data at an original array resolution; and
a non-transient memory having instructions stored thereon, which, when executed, cause the one or more processors to perform steps comprising:
detecting a luminance condition associated with acquisition of the original image data by the photodetector array, the luminance condition being detected as one of a predetermined set of luminance conditions, comprising at least a high-luminance condition and a low-luminance condition; and
generating sensor output signals to represent a Bayer-RGB output array based on the original image data and the luminance condition by:
responsive to detecting the luminance condition as the high-luminance condition, remosaicking the original image data to convert from the hexa-deca RGBW CFA to the Bayer-RGB output array at an output array resolution; and
responsive to detecting the luminance condition as the low-luminance condition, directing downsampling of the original image data into a downsampled Bayer array and a downsampled luminance array, and upsampling the downsampled Bayer array based on the downsampled luminance array to generate the Bayer-RGB output array at the output array resolution.

13. The image sensor system of claim 12, further comprising:
the photodetector array comprising a plurality of photodetectors, and a plurality of color filters each disposed over an associated one of the plurality of photodetectors to form the hexa-deca RGBW CFA; and
readout circuitry coupled between the photodetector array and at least one of the one or more processors, and configured to:

readout the original image data from the photodetector array at the original array resolution responsive to detecting the luminance condition as the high-luminance condition; and readout binned image data from the photodetector array at a downsampled resolution responsive to detecting the luminance condition as the low-luminance condition.

14. The image sensor system of claim 12, further comprising:
a luminance sensor coupled with the one or more processors to sense an ambient luminance for the photodetector array,
wherein the detecting the luminance condition is based on the ambient luminance.

15. The image sensor system of claim 12, wherein:
the low-luminance condition is a first low-luminance condition;
the predetermined set of luminance conditions further comprises a second low-luminance condition;
responsive to detecting the luminance condition as the first low-luminance condition, the directing downsampling is by a first downsampling factor, such that each of the downsampled Bayer array and the downsampled luminance array has a first downsampled resolution that is smaller than the original array resolution by the first downsampling factor; and
responsive to detecting the luminance condition as the second low-luminance condition, the directing downsampling is by a second downsampling factor, such that each of the downsampled Bayer array and the downsampled luminance array has a second downsampled resolution that is smaller than the original array resolution by the second downsampling factor, the second downsampling factor being higher than the first downsampling factor.

16. The image sensor system of claim 15, wherein:
the directing downsampling, responsive to detecting the luminance condition as the first low-luminance condition, comprises:
directing diagonally binning the original image data to generate a quad-Bayer array at the first downsampled resolution and to generate the downsampled luminance array at the first downsampled resolution; and
remosaicking the quad-Bayer array into the downsampled Bayer array; and
the upsampling, responsive to detecting the luminance condition as the first low-luminance condition, comprises:
scaling up the downsampled Bayer array based on the first downsampling factor to generate an upscaled Bayer-RGB array;
scaling up the downsampled luminance array based on the first downsampling factor to generate an upscaled luminance array; and
upsampling the upscaled Bayer-RGB array based on the upscaled luminance array to generate the Bayer-RGB output array at the output array resolution.

17. The image sensor system of claim 15, wherein:
the directing downsampling, responsive to detecting the luminance condition as the second low-luminance condition, comprises:
directing diagonally binning the original image data to generate a quad-Bayer array at the first downsampled resolution and to generate a pre-downsampled luminance array at the first downsampled resolution; and
re-binning the quad-Bayer array and the pre-downsampled luminance array to generate the downsampled Bayer array and the downsampled luminance array at the second downsampled resolution,
wherein the diagonally binning and the re-binning together downsample the original image data by the second downsampling factor; and
the upsampling, responsive to detecting the luminance condition as the second low-luminance condition, comprises:
scaling up the downsampled Bayer array based on the second downsampling factor to generate an upscaled Bayer-RGB array;
scaling up the downsampled luminance array based on the second downsampling factor to generate an upscaled luminance array; and
upsampling the upscaled Bayer-RGB array based on the upscaled luminance array to generate the Bayer-RGB output array at the output array resolution.

18. The image sensor system of claim 15, wherein:
the directing downsampling, responsive to detecting the luminance condition as the second low-luminance condition, comprises directing diagonally binning the original image data to generate the downsampled Bayer array at the second downsampled resolution and to generate the downsampled luminance array at the second downsampled resolution; and
the upsampling, responsive to detecting the luminance condition as the second low-luminance condition, comprises:
scaling up the downsampled Bayer array based on the second downsampling factor to generate an upscaled Bayer-RGB array;
scaling up the downsampled luminance array based on the second downsampling factor to generate an upscaled luminance array; and
upsampling the upscaled Bayer-RGB array based on the upscaled luminance array to generate the Bayer-RGB output array at the output array resolution.

19. The image sensor system of claim 12, wherein:
acquisition of the original image data is in an image acquisition frame by the photodetector array; and
the detecting the luminance condition is based on luminance data acquired prior to the image acquisition frame.

20. The image sensor system of claim 12, wherein:
the photodetector array comprises a plurality of array regions; and
the detecting the luminance condition comprises detecting respective region-level luminance conditions for each of at least a portion of the plurality of array regions.

* * * * *